United States Patent Office 2,798,882
Patented July 9, 1957

2,798,882

PREPARATION OF ACRYLONITRILE

George L. Christopher, New Canaan, and Erwin L. Carpenter, Stamford, Conn., and Marshall L. Spector, Ballston Lake, N. Y., assignors to American Cyanamid Company, New York, N. Y., a corporation of Maine No Drawing. Application December 19, 1955,
Serial No. 553,691

6 Claims. (Cl. 260—465.3)

This invention relates to the preparation of acrylonitrile. More particularly, it relates to an improved method for the preparation of acrylonitrile by the liquid phase catalytic reaction of HCN and acetylene. Still more particularly, it relates to a new catalyst composition for said reaction.

Acrylonitrile is presently one of the more promising of chemical intermediates. It has already proved to be of particular value in the manufacture of a wide range of products, e. g., plastics, synthetic rubbers, synthetic fibers, soil conditioners and the like. Because of the importance of acrylonitrile, great interest exists in methods of its preparation.

One method comprises a liquid phase catalytic reaction of HCN and acetylene. Various catalysts have been suggested for carrying out this reaction. In general, however, the best catalyst is cuprous chloride. This is prepared as an aqueous solution containing, in addition, hydrochloric acid and an alkali metal or ammonium chloride as a solubilizer for the cuprous chloride. To the catalyst solution maintained at a pH of about 0–1.5 and a temperature which may range as high as 110° C., are fed HCN and acetylene. The resultant acrylonitrile-bearing reaction gas containing various impurities is usually absorbed in an aqueous medium which is then treated to obtain a purified acrylonitrile product.

One of the problems encountered when conducting the above-described reaction in water is that numerous by-products are formed. One of the more bothersome of these is acetaldehyde, for which the standard of purity in commercial acrylonitrile is quite rigid. While this standard may be met by purifying the crude acrylonitrile, procedures employed for this purpose are for the most part complex and costly. The difficulty in reducing the acetaldehyde content, moreover, is aggravated by the fact that lactonitrile, another by-product obtained in aqueous medium, dissociates into acetaldehyde and HCN.

To avoid the problem created by acetaldehyde formation, it has been proposed to conduct the reaction using a cuprous chloride catalyst in an anhydrous medium. In this way the formation of acetaldehyde is eliminated completely. Various organic solvents have been proposed. Among these there may be mentioned various straight chain amides of carboxylic acids. Although eliminating acetaldehyde formation, the use of this type of solvent has the disadvantage that the catalyst activity and the yield of acrylonitrile are adversely affected. However, a more recent proposal involving the use of lactam-type compounds as solvents has quite surprisingly minimized this disadvantage since, for some reason, they do not seriously affect the stability of the catalyst activity. The use of such catalyst solutions forms the subject matter of copending application for United States Letters Patent Serial No. 553,693, filed on even date by the applicants herein.

Although a catalyst solution comprising cuprous chloride is that most commonly employed for the reaction of HCN and acetylene to produce acrylonitrile, other compounds have also been proposed. Among these are the other cuprous halides, particularly cuprous bromide, the use of which in aqueous medium has been proposed. The activity of such a catalyst solution, however, is extremely low and practically negligible when compared to an aqueous cuprous chloride solution. For this among other reasons, primary interest has been on cuprous chloride catalysts with little if any attention directed to cuprous bromide as a catalyst.

In accordance with this invention, however, it has been quite unexpectedly discovered that cuprous bromide in an anhydrous solvent is an excellent catalyst for the reaction of HCN and acetylene. Its activity has been found to compare favorably with a catalyst comprising cuprous chloride in a similar solvent. This is particularly surprising in view of the low activity of cuprous bromide in water particularly when compared to cuprous chloride.

The solvent employed according to the process of this invention may be a straight chain amide or a compound having the lactam structure. Thus, as representative of the straight chain amides there may be mentioned formamide, acetamide and the N-methyl and N-ethyl derivatives thereof. Among the lactam-type solvents may be mentioned pyrrolidone, piperidone, caprolactam and the N-methyl and N-ethyl derivatives thereof.

Besides being quite unexpectedly as active as an anhydrous cuprous chloride catalyst, the catalyst according to this invention demonstrates a distinct advantage thereover. In the reaction of HCN and acetylene as described, monovinyl- and divinyl-acetylene are also formed in addition to acrylonitrile. The formation of these impurities may be minimized by operating under increased acidity. When using a cuprous chloride catalyst, however, vinyl chloride also forms as a by-product particularly at increased acidity. Accordingly, it becomes necessary to control the acidity to that found optimum with respect to these three impurities. In contrast, the use of a cuprous bromide catalyst does not result in vinyl bromide formation under any conditions of acidity. Therefore, the acidity of the catalyst solution may be maintained sufficiently high, as by the addition of HBr, so that the formation of monovinyl and divinyl acetylene may be practically eliminated.

In the practice of the invention the cuprous bromide catalyst is prepared by dissolving cuprous bromide in the selected organic solvent using ammonium bromide preferably in amount no more than that necessary to obtain complete dissolution. The ammonium bromide, of course, may be replaced by any of the alkali metal bromides which function similarly. To the resultant catalyst mixture are then fed acetylene and HCN at a temperature ranging from about 60° C. to the boiling point of the catalyst. The formation of impurities is so negligible that the resultant reaction gas is substantially pure acrylonitrile.

The following examples illustrate the process of this invention. These examples are intended to be illustrative only and not by way of limitation.

*Example 1*

A catalyst solution is prepared comprising 5 mols of cuprous bromide, 3 mols of ammonium bromide, 1 mol of cuprous cyanide and enough pyrrolidone to make 1 liter of catalyst solution at 105° C. Acetylene is then fed in at a rate of 7 mols/hr. and HCN at a rate such that the HCN partial pressure above the catalyst solution is maintained at about 3 mm. of Hg. The average acrylonitrile production over 20 hours is 16 g./l./hr. There is no acetaldehyde or vinyl bromide formed, and less than 0.2 g./l./hr. of monovinyl acetylene.

Example 2

A catalyst solution is prepared according to Example 1 in which the pyrrolidone is replaced by piperidone. Over 20 hours of operation, the average yield of acrylonitrile is about 15 g./l./hr. with no formation of acetaldehyde or vinyl bromide and substantially no formation of monovinyl acetylene.

Example 3

The procedure of Example 1 is again repeated, replacing the pyrrolidone with caprolactam. Over a period of 20 hours, similar results are obtained, as in Examples 1 and 2.

Example 4

A catalyst solution is prepared comprising 5 mols of cuprous bromide, 3 mols of ammonium bromide and sufficient dimethylformamide to make 1 liter of catalyst solution at 105° C. Acetylene is fed to the solution at a rate of 7 mols/hour and HCN at a rate such that the HCN partial presssure above the catalyst solution is maintained at about 3 mm. Hg. Over a period of 18 hours the average yield of acrylonitrile is 12 g./l./hr. There is no formation of acetaldehyde or vinyl bromide and less than 0.2 g./l./hr. of monovinyl acetylene.

Example 5

The procedure of Example 4 is repeated replacing the dimethylformamide with acetamide. A similar average yield of acrylonitrile is obtained with no formation of acetaldehyde or vinyl bromide and substantially no formation of monovinyl acetylene.

We claim:

1. In the preparation of acrylonitrile by the catalytic reaction of HCN and acetylene, the improvement in combination therewith for eliminating formation of acetaldehyde and vinyl halide while minimizing the formation of vinyl acetylene which comprises: conducting the reaction in the presence of an anhydrous catalyst solution comprising cuprous bromide and a solvent selected from the group consisting of a straight chain saturated amide of less than three carbon atoms, 2-pyrrolidone, 2-piperidone, caprolactam and N-alkyl derivatives thereof in which the alkyl radical contains less than 3 carbons.

2. A process according to claim 1 in which the solvent is acetamide.

3. A process according to claim 1 in which the solvent is dimethyl formamide.

4. A process according to claim 1 in which the solvent is 2-pyrrolidone.

5. A process according to claim 1 in which the solvent is 2-piperidone.

6. A process according to claim 1 in which the solvent is caprolactam.

References Cited in the file of this patent

UNITED STATES PATENTS

| 2,409,124 | Heuser | Oct. 8, 1946 |
| 2,698,337 | Heider et al. | Dec. 28, 1954 |
| 2,715,137 | Copelin | Aug. 9, 1955 |